(12) United States Patent
Abadi et al.

(10) Patent No.: US 9,878,468 B2
(45) Date of Patent: Jan. 30, 2018

(54) METHOD FOR MANUFACTURING ARTICLES FROM E-WASTE FEEDSTOCKS

(71) Applicant: Image Microsystems, Inc., Austin, TX (US)

(72) Inventors: Alex Abadi, Austin, TX (US); Michael Terry McMullen, Jr., Austin, TX (US); Dan Michael Adams, Georgetown, TX (US); Robert Gallagher, Georgetown, TX (US)

(73) Assignee: Microstate Manufacturing, Kyle, TX (US)

( * ) Notice: Subject to any disclaimer, the term of this patent is extended or adjusted under 35 U.S.C. 154(b) by 188 days.

(21) Appl. No.: 14/516,973

(22) Filed: Oct. 17, 2014

(65) Prior Publication Data

US 2015/0209977 A1 Jul. 30, 2015

Related U.S. Application Data

(63) Continuation-in-part of application No. 13/109,545, filed on May 17, 2011, now abandoned.
(Continued)

(51) Int. Cl.
*B29B 17/00* (2006.01)
*B29B 17/04* (2006.01)
(Continued)

(52) U.S. Cl.
CPC ............ *B29B 17/00* (2013.01); *B29B 17/02* (2013.01); *B29B 17/0412* (2013.01);
(Continued)

(58) Field of Classification Search
CPC ........ B29B 2017/0203; B29K 2055/02; B29K 2105/26; B29L 2031/7232; C08J 11/06;
(Continued)

(56) References Cited

U.S. PATENT DOCUMENTS

| 6,007,005 A | 12/1999 | Gonzales et al. |
| 6,080,473 A | 6/2000 | Oriseh et al. |
| 7,902,262 B2 | 3/2011 | Armstrong et al. |

FOREIGN PATENT DOCUMENTS

AU WO 2005/123817 * 12/2005

OTHER PUBLICATIONS

Boerrigter, H.; "Implementation of thermal processes for feedstock recycling of bromine and antimony, with energy recovery, from plastics waste of electrical and electronic equipment (WEEE); phase 1: Literature survey/status update, evaluation, and ranking of combustion, gasification, and pyrolysis based technologies"; ECN Biomass of the Netherlands Energy Research Foundation, Project No. ECN-C--00-114; 71 pages; Nov. 2000.

Motyakin and Schlick, "Thermal degradation at 393 K of poly(acrylonitrile-butadiene-styrene) (ABS) containing a hindered amine stabilizer: a study by 1D and 2D electron spin resonance imaging (ESRI) and ATR-FTIR"; Department of Chemistry, University of Detroit Mercy, Detroit, MI, Polymer Degradation and Stability Study; vol. 76, Issue 1, 2002, 4 pages.

(Continued)

*Primary Examiner* — Frances Tischler
(74) *Attorney, Agent, or Firm* — John A. Fortkort; Fortkort & Houston PC

(57) ABSTRACT

A method of recycling plastic e-waste material and products made from recycled e-waste involves one or more separate streams of different plastic waste which are reduced to small granular form, blended together or separately or used separately before insertion into a compounder which reduces the small sized plastic particles to a semi-molten emulsion. The emulsion is placed in a press and molded to a final product shape. The final product is finished and inspected. The products from the recycled plastic e-waste can be used as substrates on road signs.

19 Claims, 29 Drawing Sheets

Related U.S. Application Data

(60) Provisional application No. 61/345,269, filed on May 17, 2010.

(51) Int. Cl.
    *B29B 17/02*     (2006.01)
    *C08J 11/06*     (2006.01)
    *B29K 55/02*     (2006.01)
    *B29K 105/26*     (2006.01)
    *B29L 31/00*     (2006.01)

(52) U.S. Cl.
CPC ....... *C08J 11/06* (2013.01); *B29B 2017/0203* (2013.01); *B29K 2055/02* (2013.01); *B29K 2105/26* (2013.01); *B29L 2031/7232* (2013.01); *C08J 2355/02* (2013.01); *Y02P 20/582* (2015.11); *Y02W 30/701* (2015.05); *Y10T 428/24802* (2015.01)

(58) Field of Classification Search
CPC ................ Y02P 20/582; Y02W 30/701; Y10T 428/24802
See application file for complete search history.

(56) References Cited

OTHER PUBLICATIONS

PerkinElmer, Frequently Asked Questions, Thermogravimetric Analysis (TGA), A Beginner's Guide; 2010; 19 pages.

Zenkiewicz, M. et al.; "Some effects of multiple injection moulding on selected properties of ABS"; Journal of Achievements in Materials and Manufacturing Engineering; vol. 37, Issue 2, Dec. 2009; 8 pages.

Steinwall, Inc. information paper; Acrylonitrile Butadiene Styrene (ABS); 2007; 1 page.

Hitachi High-Tech Science Corporation Application Brief; "Thermal Decomposition Measurement of ABS resin I"; TA No. 66, Mar. 1995; 6 pages.

Plastics: Acrylonitrile-Butadiene-Styrene (ABS); www.rtvanderbilt.com/plastics_11_7; Jan. 29, 2013; 8 pages.

RTP 600 UV Product Data Sheet and General Processing Conditions; www.rtpcompany.com/info/data/0600/RTP600UV; Jan. 29, 2013; 2 pages.

Thermoplastic: Acrylonitrile-Butadiene-Styrene (ABS) (Subs Tech); www.substech.com; Jan. 29, 2013; 2 pages.

Hangzhou Disheng Import & Export Co., Ltd; UV770 (Low Molecular Weight Hindered Amine Light Stabilizer (HALS); www.shinyangchem.com; Jan. 29, 2013; 3 pages.

\* cited by examiner

METHOD FOR MANUFACTURING ARTICLES FROM E-WASTE FEEDSTOCKS

CROSS REFERENCE TO RELATED APPLICATIONS

This application is a continuation-in-part application which claims priority to U.S. Ser. No. 13/109,545 (Abadi et al.), entitled "Plastic Recycling Method and Manufactured Product," which was filed on May 17, 2011, and which is incorporated herein by reference in its entirety; and which claims priority to U.S. Ser. No. 61/345,269 (Abadi et al.), entitled "Plastic Recycling Method and Manufactured Product," which was filed on May 17, 2010, which is incorporated herein by reference in its entirety.

FIELD OF THE DISCLOSURE

The present disclosure relates generally to multi-paneled articles, and more particularly to multi-paneled signage substrates and methods for making the same.

BACKGROUND OF THE DISCLOSURE

In recent years, environmental concerns have begun to mount about the volume of electronic waste (e-waste) plastic making its way into landfills. These concerns have been exacerbated by the increasing proliferation of computers, cellular telephones and other electronic devices that generate significant volumes of e-waste.

Many plastic products are currently recycled, although often on a smaller than desirable small scale. One of the difficulties in recycling e-waste plastic materials is that it is typically difficult to obtain large quantities of the same types of plastic materials. Moreover, many recycling collection processes generally lump all plastic parts or products together, thereby preventing easy separation of the different types of plastics.

Some attempts have been made to address the foregoing issues. For example, one recycling trend, initially implemented in Europe, is to require the manufacturers of certain e-waste plastic parts (particular computer and cellular telephone parts) to take back the product at the end of its useful life. This approach at least accumulates larger volumes of e-waste in one location to which recycling processes may be applied in a more efficient manner. However, many problems attendant to the recycling of e-waste plastics still remain.

SUMMARY OF THE DISCLOSURE

Figure 1:
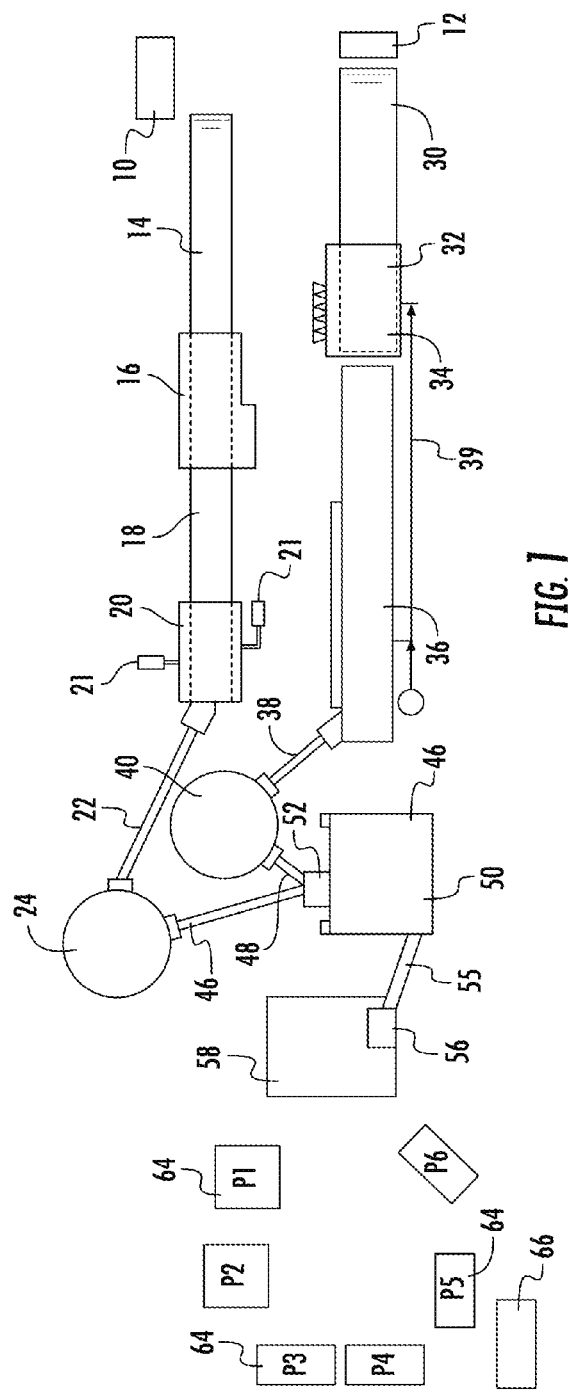
FIG. 1 is a schematic diagram of an e-waste plastic recycling method equipment layout.
Figure 2:
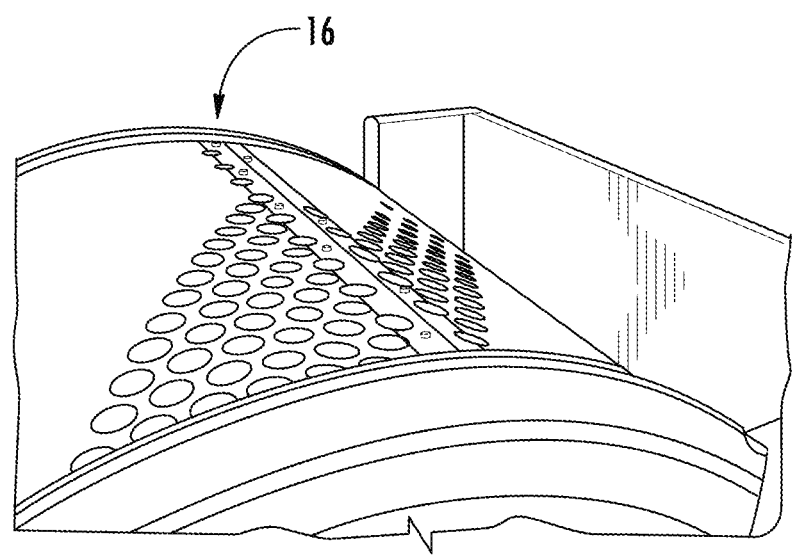
FIG. 2 is a partial perspective view of the tumbler shown in FIG. 1.

In one aspect, methodologies are disclosed herein for recycling thermoplastic materials from e-waste streams into new products. Products made by such methods are also disclosed.

In another aspect, methodologies are disclosed herein for recycling products made from e-waste thermoplastic materials. These methodologies include the steps of breaking down plastic parts into smaller particulates, converting the plastic particulates into a semi-molten mass, and molding the semi-molten mass to form new products. The step of breaking down the e-waste plastic parts into particulates may include the steps of cutting the plastic parts into smaller pieces, and using at least one of a tumbling operation and a grinding operation to reduce the small pieces into smaller particulates. During the grinding operation, the temperature of the small sized plastic parts may be maintained below the melting point of the plastic parts by the injection of cold air during the grinding process.

In a further aspect, a first stream of plastic parts is provided which is obtained from computer and printer parts formed substantially of ABS plastic. A second, separate material stream is provided which is obtained from printer ink cartridges. The second material stream is processed to reduce the ink cartridges into small particulates, and to separate the foam ink insert from the plastic particulates. The materials from the first and second material streams may be stored in separate silos. Selected quantities range between 0 and 100% of each of the first and second material streams may then be transferred to a blender which weighs the material and forms a blended mass in the selected percentage of the first and second material particulates. The blended mass may then be transferred to a compounder, which reduces the particulates of the blended mass into a semi-molten state. The semi-molten mass from the compounder may then be transferred in a carrier which is surrounded with a ventilation apparatus to remove emissions and particulates from the semi-molten mass. The semi-molten mass may then be transferred to a mold to form an end product.

In still another aspect, a method is provided which comprises (a) providing a feedstock comprising an ABS plastic which contains a flame retardant and a UV inhibitor; (b) heating the feedstock until it is in a semi-molten state; and (c) molding the feedstock into an article while it is in the semi-molten state.

In yet another aspect, a method is provided for manufacturing a product from first and second e-waste feed streams, wherein the first e-waste feed stream comprises thermoplastic materials from electronic equipment housings, wherein the second e-waste feed stream comprises plastic ink cartridges, and wherein each of the ink cartridges includes a foam insert. The method comprises (a) processing the first e-waste feed stream by (a) breaking down plastic parts into particulates, and (b) depositing the particulates into a first storage container; (b) processing the second e-waste feed stream by (a) breaking down plastic ink cartridges into plastic particulates, (b) separating a foam insert from the plastic particulates, and (c) transferring the plastic particulates to a second storage container; (c) blending predetermined quantities of the e-waste plastic particulates from the first and second storage containers to form a blended mass; and (d) molding the blended mass into a product while the blended mass is in a semi-molten state.

In another aspect, a road sign substrate is provided which is adapted to receive decorate road signs indicia on at least one surface thereof. The substrate comprises a molded, single piece body formed of a material consisting of recycled, reground e-waste ABS plastic containing flame retardants and UV inhibitors from at least one of computer housings and printer cartridges, wherein the at least one of computer housings and printer cartridges comprises ABS plastic containing said flame retardants and UV inhibitors, and wherein the amount of said flame retardants in the ABS in said molded body is substantially the same as the amount of said flame retardants and UV inhibitors in the waste ABS.

In a further aspect, a road sign is provided which comprises a molded body formed by (a) grinding a waste stream comprising items selected from the group consisting of computer housings and printer cartridges to yield a particulate mass, (b) thermally softening the particulate mass, and (c) molding the thermally softened particulate mass to form the molded body, wherein the waste stream comprises ABS plastic containing flame retardants and UV inhibitors, and wherein the amount of said flame retardants in the ABS in said molded body is substantially the same as the amount of said flame retardants in the ABS of the waste stream; and a road sign indicia applied to at least one surface of the single piece body.

In still another aspect, an article is provided which comprises an ABS plastic containing at least one additive selected from the group consisting of flame retardants and UV inhibitors. The article is molded from a feedstock containing the at least one additive, wherein the at least one additive is retained in the article by molding the feedstock while it is in a semi-molten state.

In another aspect, an article is provided which comprises an ABS plastic containing a flame retardant. The article is molded from a feedstock which contains the flame retardant, wherein the feedstock is derived from items selected from the group consisting of computer housings and ink cartridges, and wherein the flame retardant is retained in the article by molding the feedstock while it is in a semi-molten state.

In another aspect, a product may be made in accordance with one of the above-described methods. The product may, for example, be employed as a base or substrate for a road sign or any other signage. Decorative indicia may be applied to one surface of the substrate in the form of a decorative film, or may be printed directly on the surface of the substrate form a sign. The substrate may also be molded to its final shape without decorative indicia for other applications, such as landscape, stepping stones, and other articles.

DETAILED DESCRIPTION

In light of the foregoing problems, a need exists in the art for improvements in methods for recycling e-waste plastics, such as those derived from hard plastic computer parts and inkjet cartridges, and for manufacturing products made from such recycled plastics. These needs may be met by the systems, methodologies and products disclosed herein.

The systems, methodologies and products disclosed herein will frequently be described with respect to the recycling of acrylonitrile butadiene styrene (ABS) plastic. ABS plastic is typically used to form ink cartridges and rigid electronic parts, such as computer and printer housings. However, it will be understood that these systems, methodologies and products may also employ with, or be based on, other plastics. Such plastics include rigid plastics and thermoplastics such as, for example, polycarbonate, polystyrene, SAN (styrene-acrylonitrile), polyvinylchloride (PVC), acrylics, fluoropolymers and polymides. Such plastics also include crystalline thermoplastics such as acetal, nylon, polyethylene, polypropylene and polyesters, or liquid crystalline plastics. Mixtures and copolymers of these materials may also be used in practicing or producing the systems, methodologies and products disclosed herein.

The systems, methodologies and products disclosed herein may be further understood by the particular, non-limiting embodiment of the process disclosed in FIGS. 1-24. As seen in FIG. 1, computers and inkjet cartridges arrive at the manufacturing site and are dissembled and sorted into a first recycling stream comprising bulk e-waste plastic 10 and a second recycling stream comprising ink cartridges 12. The pieces of e-waste plastic 10 are cut or broken down at a bulk plastic staging area into pieces no larger than 12 inches by 18 inches.

Figure 3:
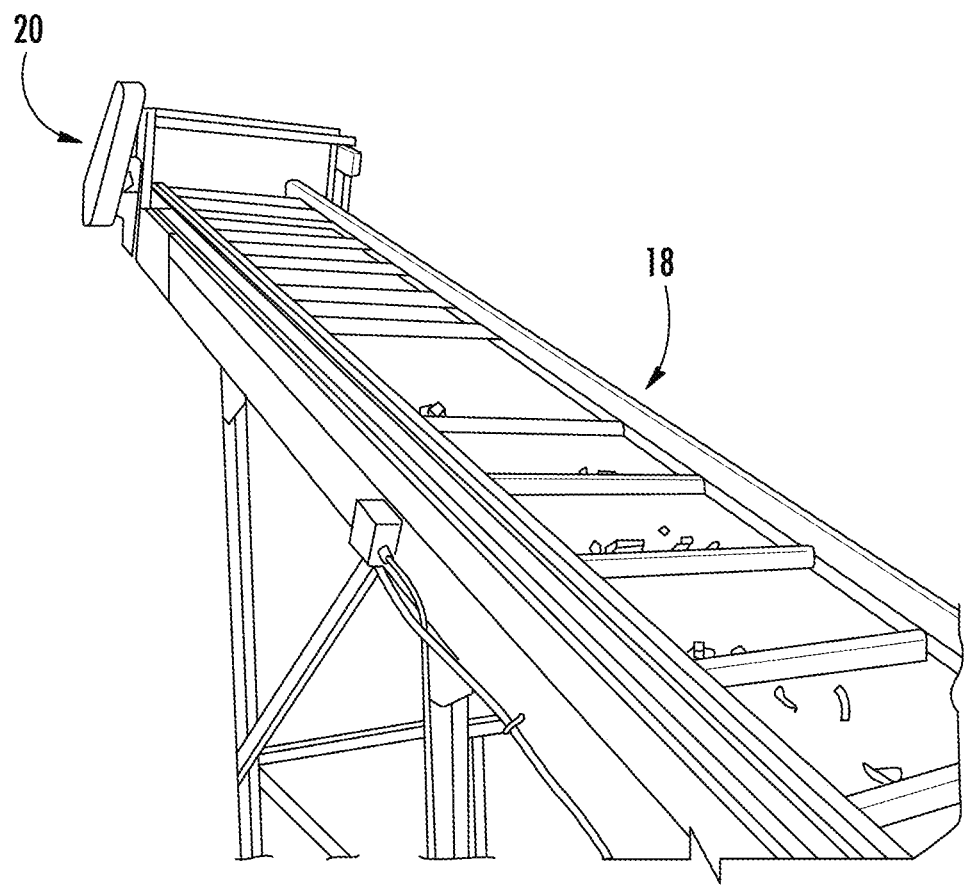
FIG. 3 is a perspective view of the conveyor used to convey broken down plastic from the tumbler to the grinder shown in FIG. 1.
Figure 4:
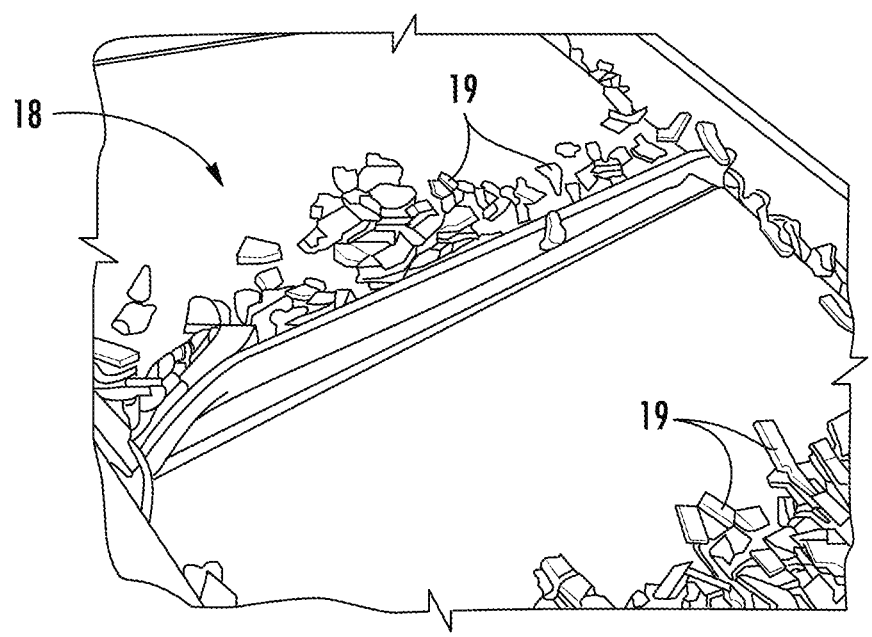
FIG. 4 is an enlarged perspective view of the plastic particles on the conveyor shown in FIG. 3 after exiting the tumbler.
Figure 5:
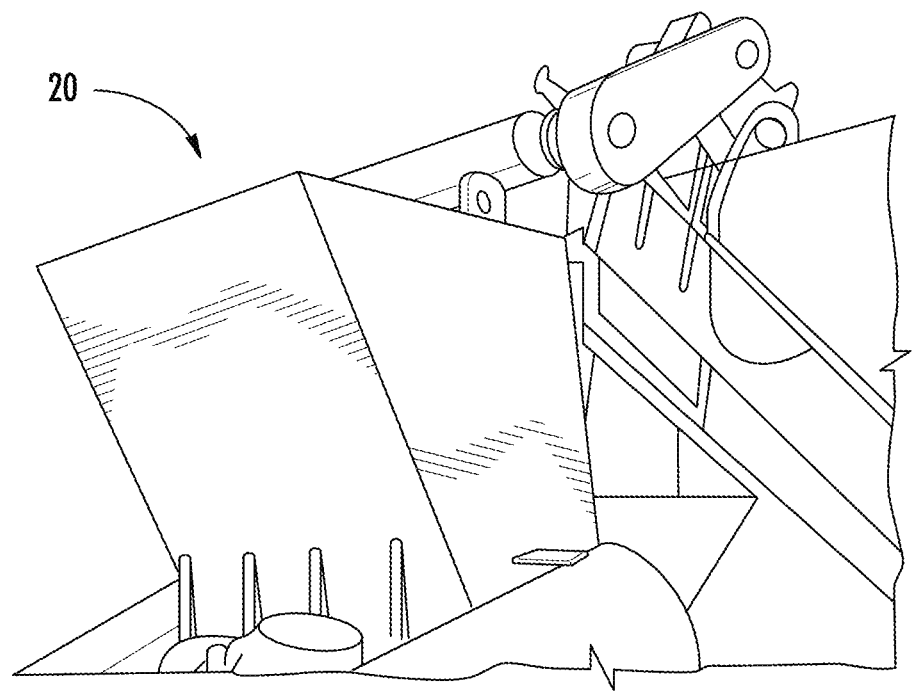
FIG. 5 is a partial perspective view of the grinder shown in FIG. 4.
Figure 6:
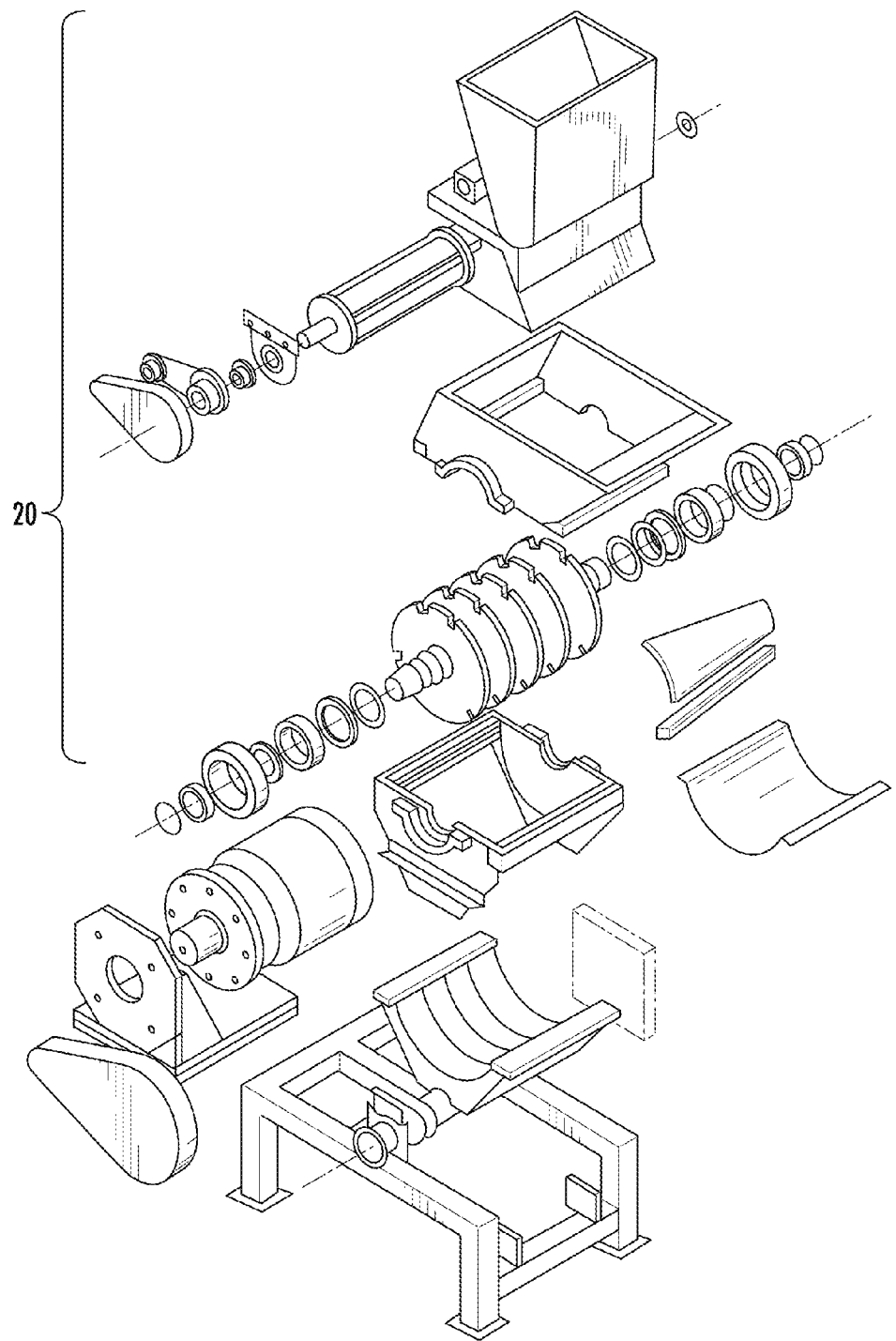
FIG. 6 is an exploded, perspective view of the components forming the grinder.
Figure 7:
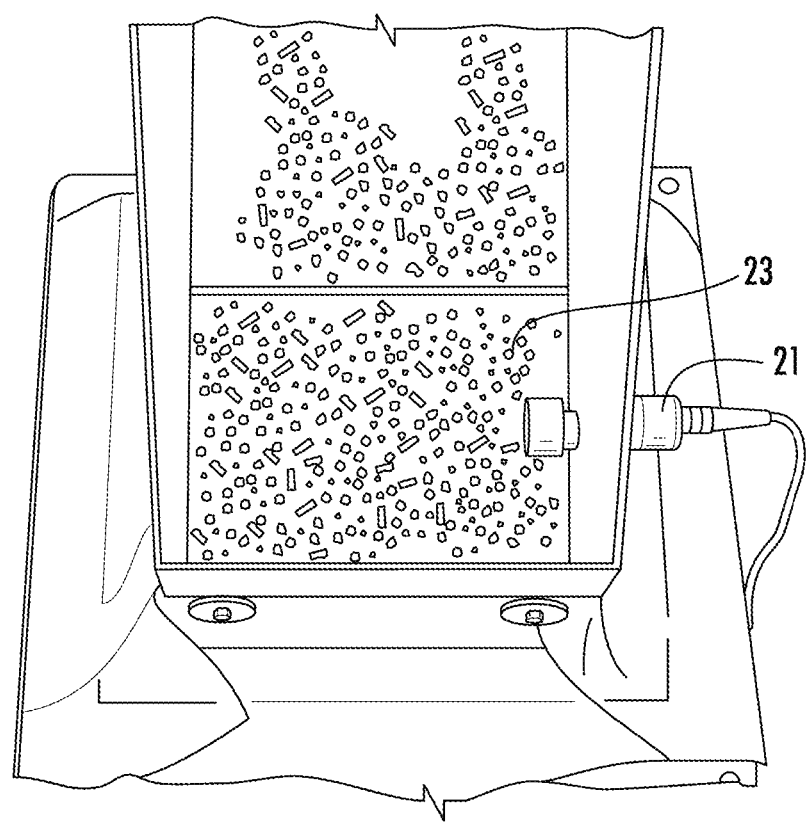
FIG. 7 is a perspective view of the small plastic particles exiting the grinder.

In a first plastic material recycling stream, the computer, printer, or other rigid e-waste plastic parts 10 are conveyed by a modified conveyor 14 to a tumbler 16. The tumbler 16 may be, for example, a model no. 136AZ-45 tumbler manufactured by Shred Pax, Inc. (Wood Dale, Ill.). The tumbler 16, which is shown in greater detail in FIG. 2, includes two rotating cylinders carrying teeth which break down the rigid e-waste plastic 10 into small pieces 19, as shown in FIGS. 3-4. After processing in the tumbler 16, the material is typically reduced in size to between ¼"×1" and 1"×2".

As seen in FIGS. 3-4, the material is then conveyed by conveyor 18 to a super grinder 20 (see FIG. 5) which may be, for example, a Shred Pax, Inc. model no. 136AZ-7V grinder. The super grinder 20, which is shown in greater detail in FIG. 6, has been customized from its original design to a more robust construction by replacing its aluminum teeth and screws with steel teeth and screws. The super grinder 20 grinds the small pieces of plastic into granular form 23 shown in FIG. 7, leveraging specific temperatures of forced air. The grinder 20 is cooled by two Exair cold gun systems 21 (see also FIG. 1), which maintain a constant flow of air generated from a compressor to create a vortex. The air is filtered through a self-contained air filtration system and supplied to the grinder 20 to maintain the temperature of the ground plastic below a predetermined temperature level. This prevents significant melting of the plastic into a flowable state, in which state it has a tendency to adhere to and clog the teeth of the grinder 20. After exiting the grinder 20, the material is between 1/16"×1/16" and ⅜"×⅜" in size as seen in FIG. 9.

Figure 8:
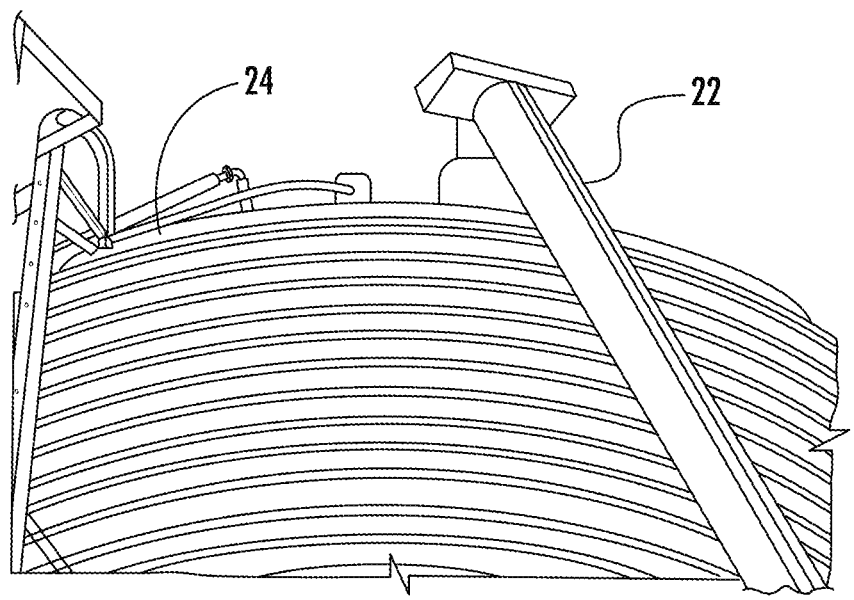
FIG. 8 is a perspective view of a custom auger used to carry the plastic particles from the discharge area of the grinder to a storage silo.

From the grinder 20, the granular plastic is transferred by an enclosed auger 22, shown in detail in FIG. 8, to a silo or hopper 24 for storage. The auger 22 is completely enclosed substantially along its entire length to prevent the escape of particulates as the granular plastic moves along the auger 22.

Figure 9:
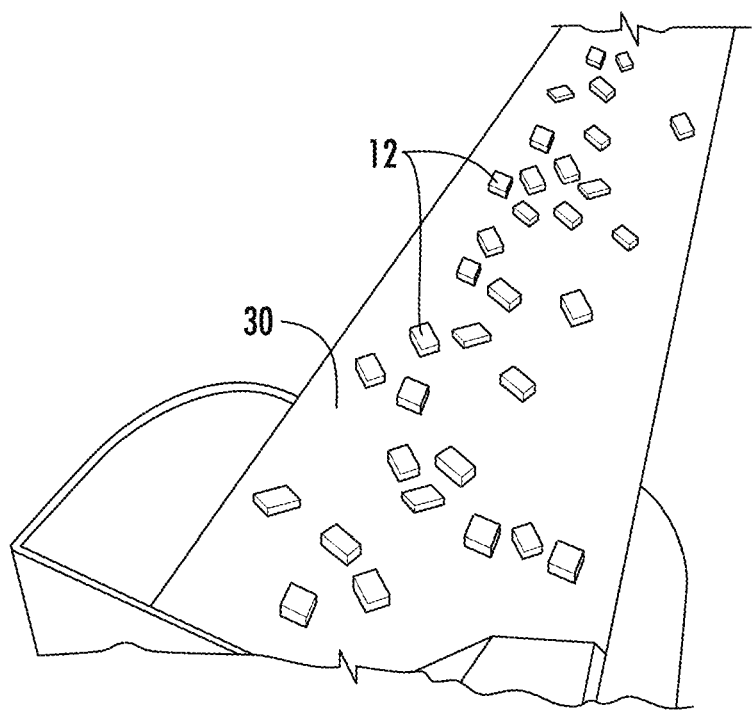
FIG. 9 is a perspective view of a conveyor used to transport bulk printer ink cartridges to the cracker/grinder shown in FIG. 1.
Figure 10:
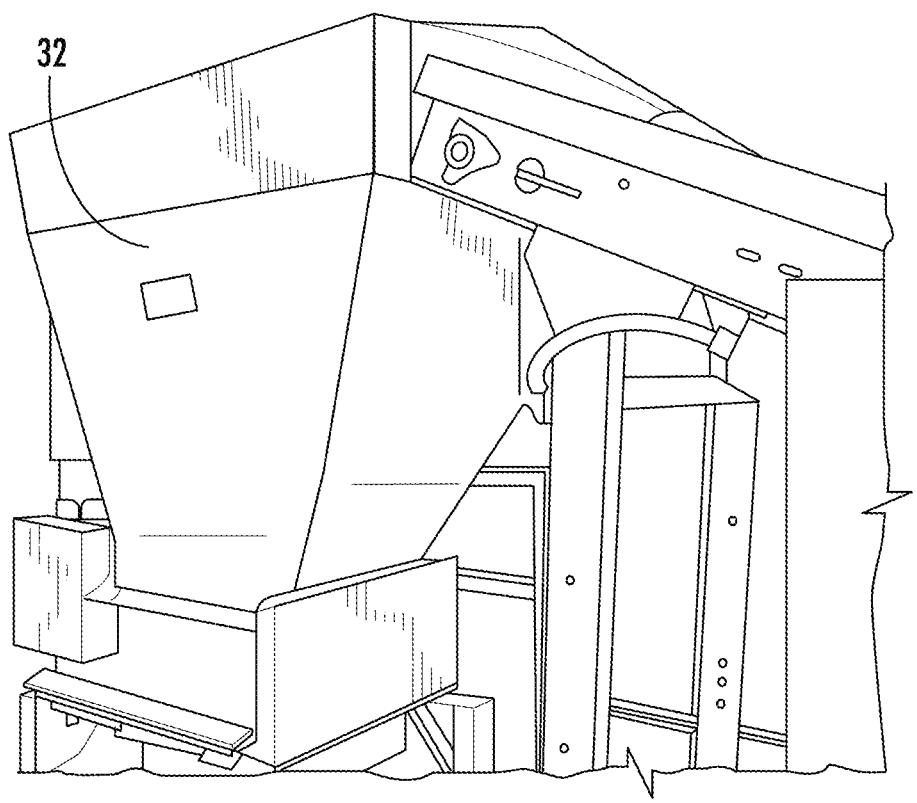
FIG. 10 is a perspective view of the custom cracker/grinder shown in FIG. 1.
Figure 11:
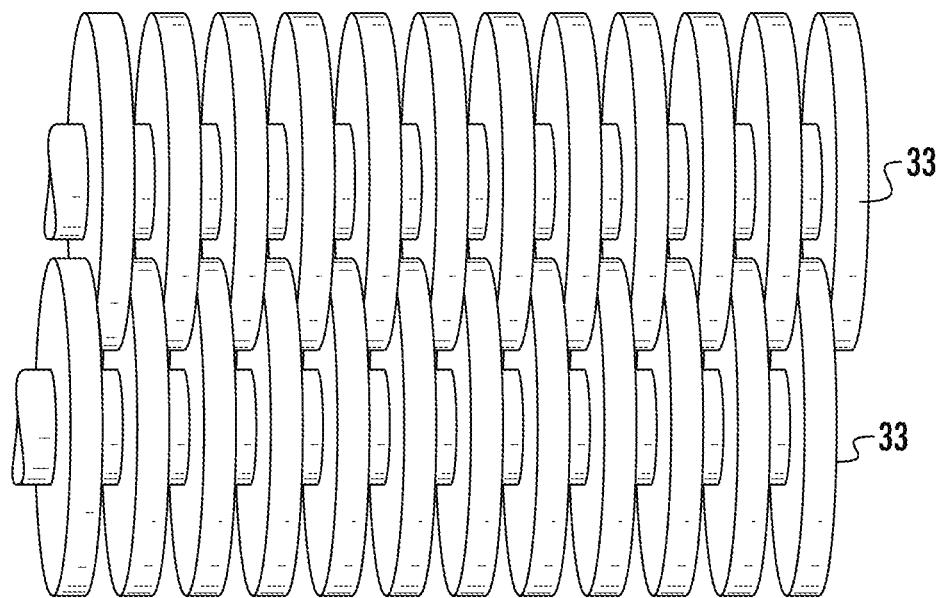
FIG. 11 is an enlarged plan view of the knives in the cracker/grinder.

With reference to FIGS. 1 and 9, in a separate, parallel, second plastic material recycling stream, the bulk printer ink cartridges 12 are placed on a conveyor 30 and are transported to a cracker 32. The cracker 32, which is shown in greater detail in FIG. 10, contains a series of rotating knives 33 (see FIG. 11) which are enclosed and specifically sized. These knives 33 operate to break open the plastic shell of the ink cartridges 12, thus exposing the polyurethane foam insert therein.

Figure 12:
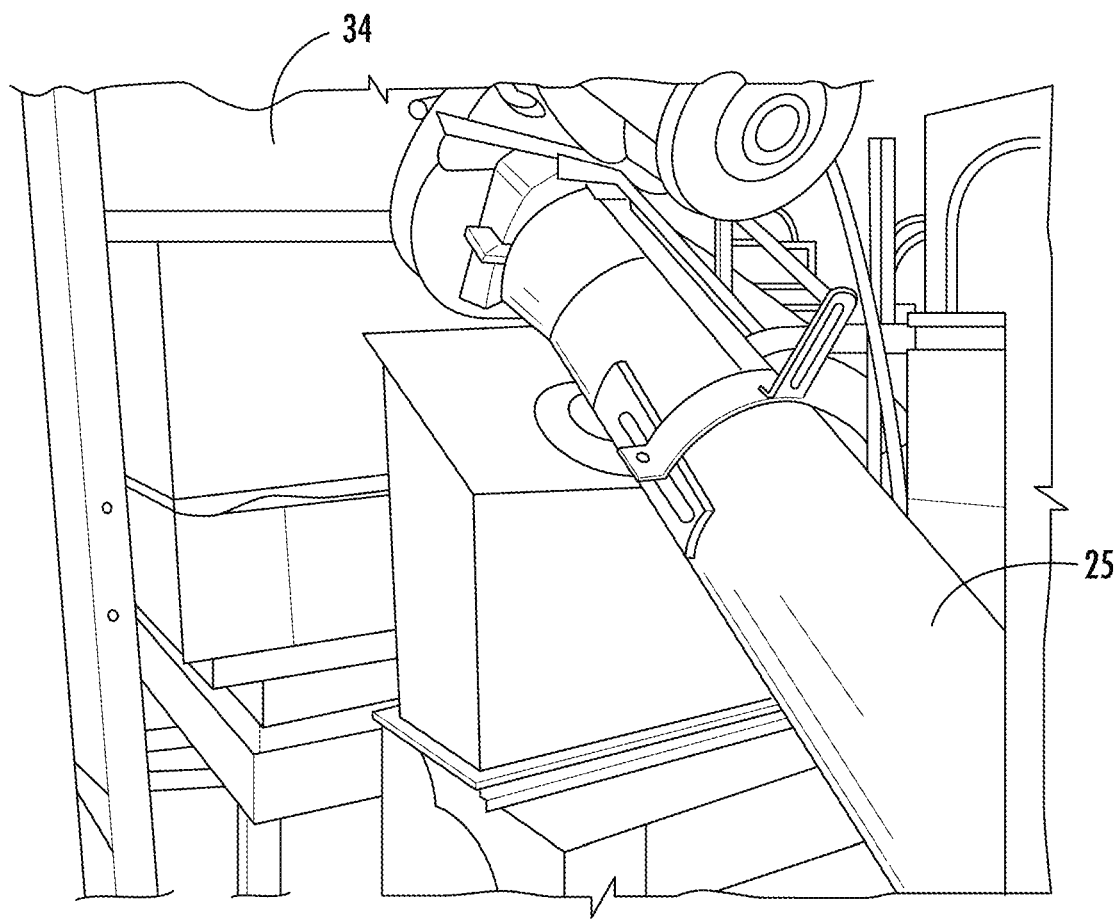
FIG. 12 is a perspective view of the conveyor/auger used to transport the plastic particles from the cracker to the chipper shown in FIG. 1.
Figure 13:
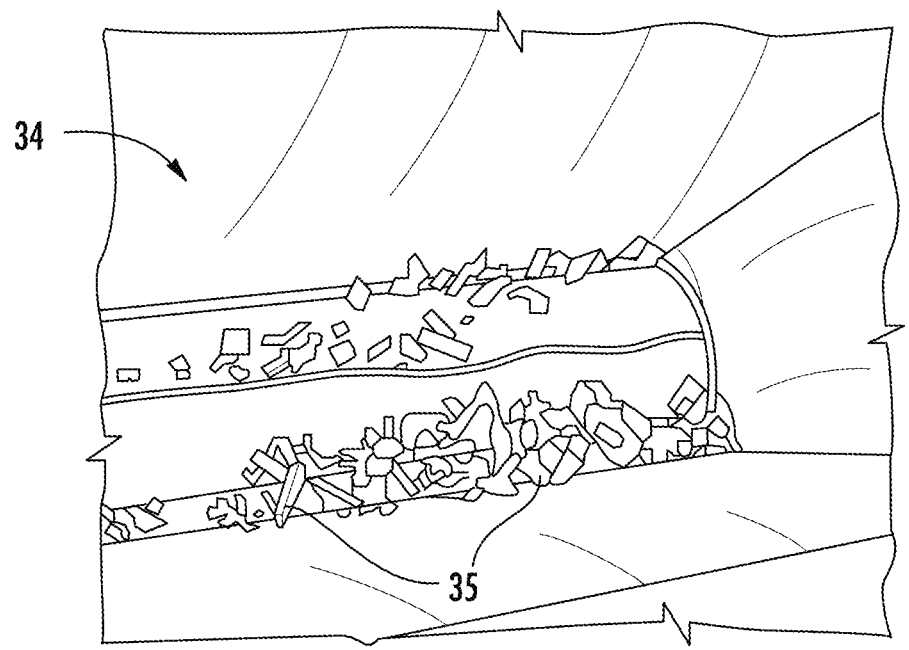
FIG. 13 is a perspective view of the interior of the chipper showing the reduction of the plastic material into granules.

As seen in FIG. 12, the plastic is then transferred, via an enclosed auger 25, from the cracker 32 to an enclosed and bladed chipper/grinder 34. The chipper/grinder 34 is rotating and double-edged, and grinds the plastic material into granular form 35 as seen in FIG. 13. More specifically, the chipper 34 in this particular embodiment is modified to have 10 mill teeth size, a variable speed motor and a safety lid. The auger 25 is designed to prevent emissions to the ambient environment from the granular pieces 35.

Figure 14:
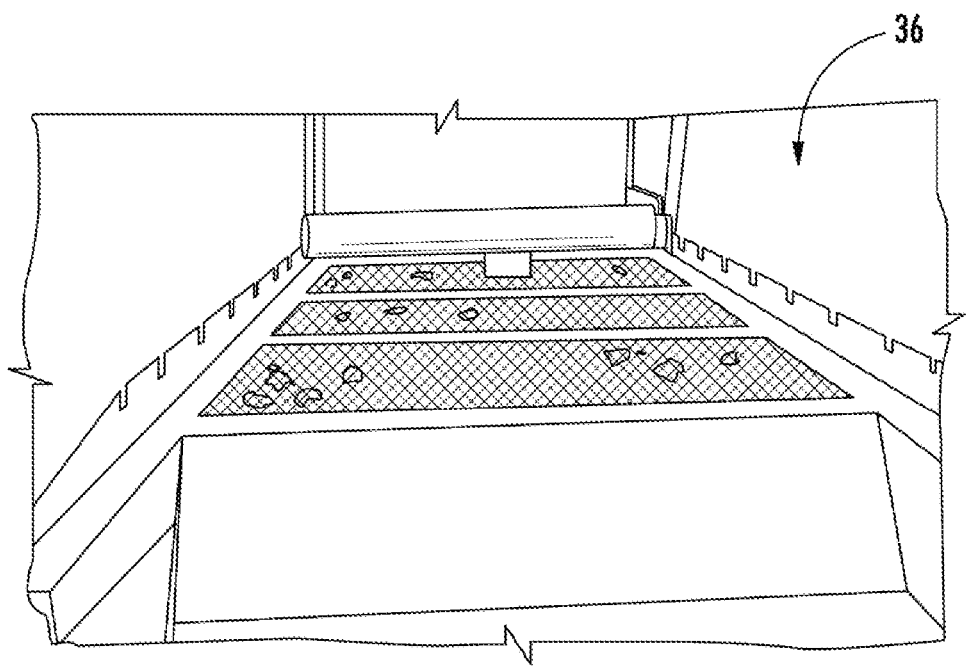
FIG. 14 is a perspective view of the interior of the shaker table shown in FIG. 1.
Figure 15:
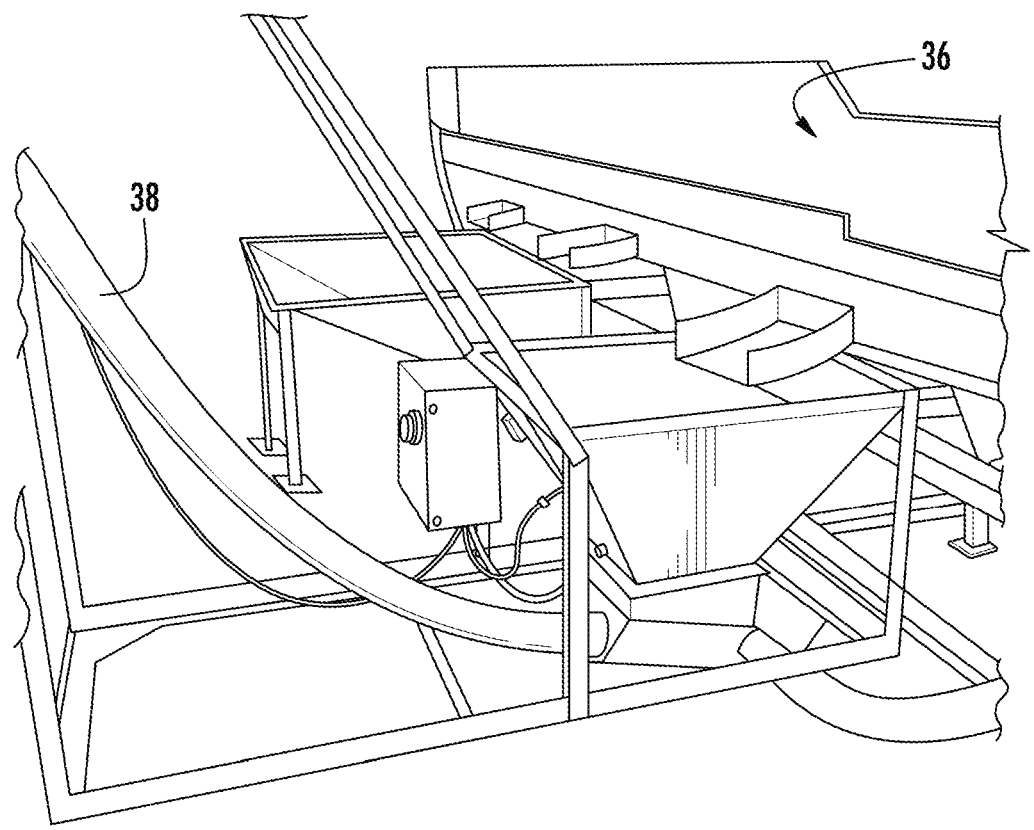
FIG. 15 is a perspective view of the conveyor used to transport the plastic pieces from the shaker table to a storage silo.
Figure 16:
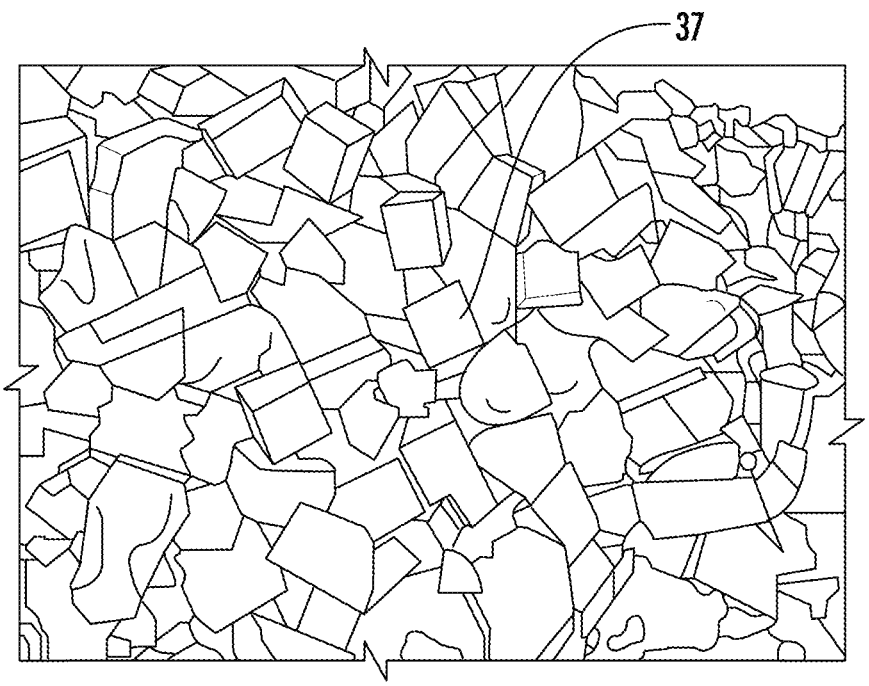
FIG. 16 is a plan view of the foam pieces after separation from the plastic pieces on the shaker table.

The granular pieces 35 are then transferred from the chipper/grinder 34 to a modified shaker table 36, shown in FIG. 14. The shaker table 36 separates the foam 37 (see FIG. 16) from the plastic particles. As the shaker table 36 vibrates, the plastic particles fall through a grate and are routed to a storage silo 40 by an enclosed auger 38 as shown in FIG. 15.

As shown in FIG. 1, at least one regrind conveyor 39 is provided along the shaker table 36 and extends from an outlet or discharge port on the shaker table 46 back to the grinder 34. This enables larger pieces of the second stream plastic parts to be returned to the grinder 34 and reground into smaller pieces. One or two regrind conveyors 39 may be provided on opposite sides of the shaker table 36, for example. The foam pieces 37 (see FIG. 14) bounce to the end of the shaker table 36, where they fall into a suitable container, such as a lined Gaylord box. Once collected, the foam pieces 37 are sent off-site for further processing into suitable products, such as alternative energy products.

Figure 18:
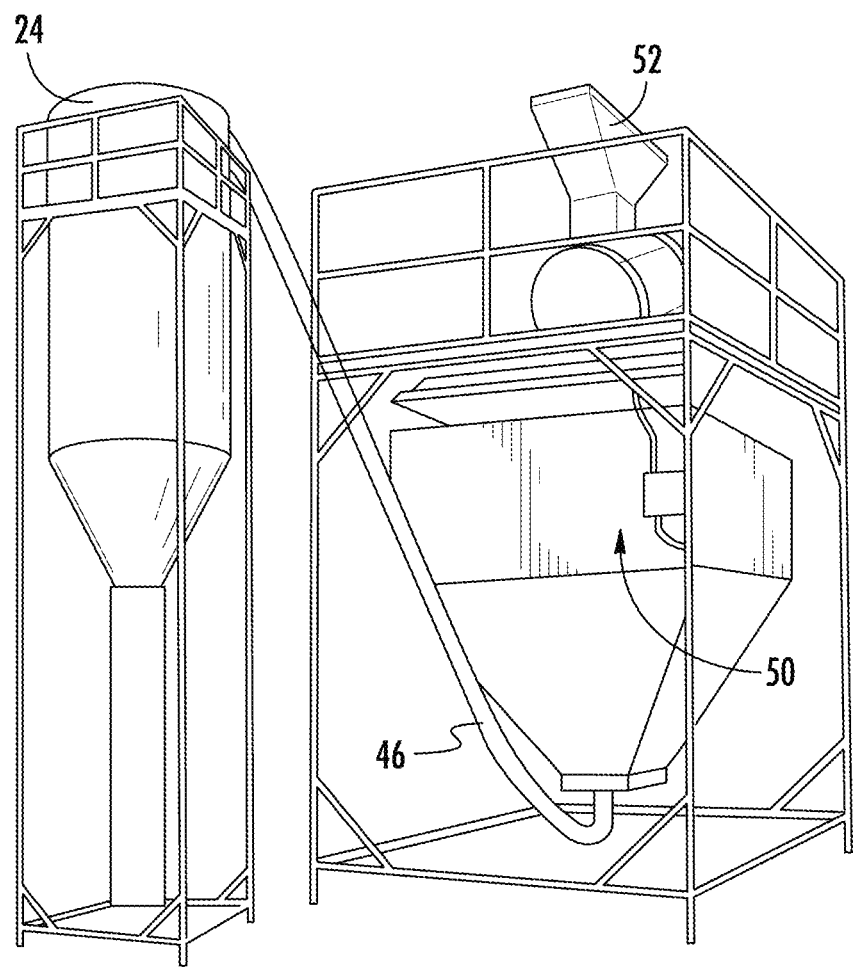
FIG. 18 is a side elevational view of the compounder and ventilation apparatus shown in FIG. 1.
Figure 19:
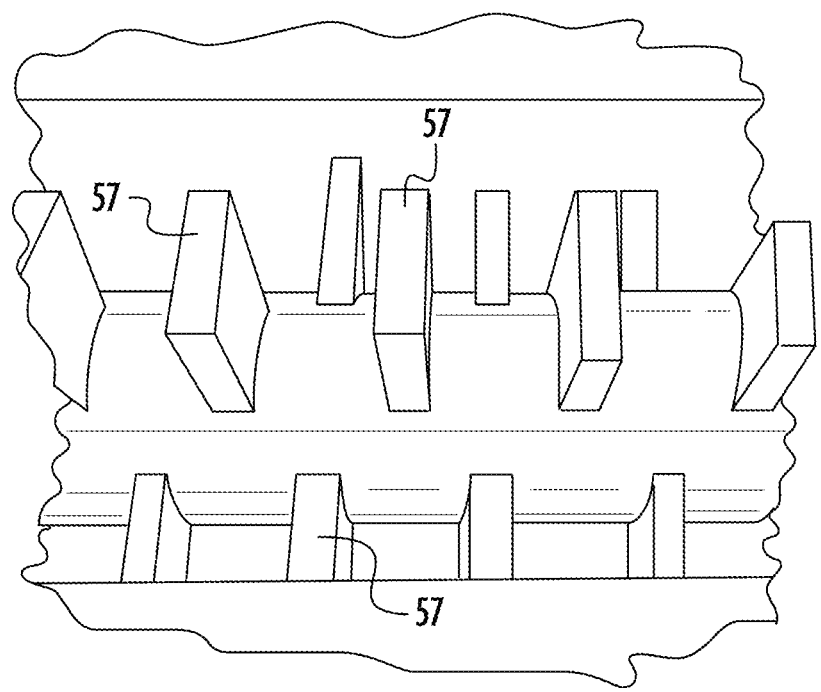
FIG. 19 is a partial perspective view of the compounder teeth.
Figure 20:
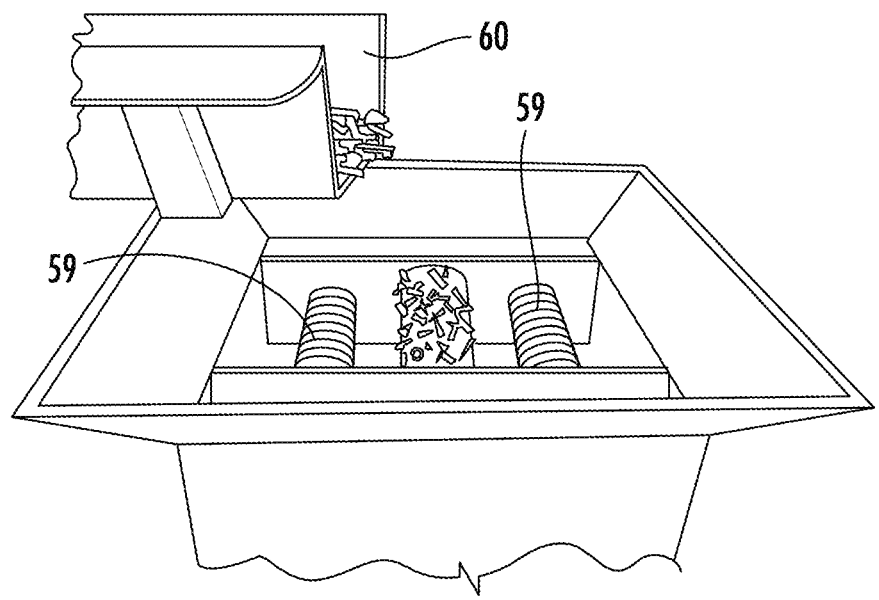
FIG. 20 is a perspective view of the plastic particulates input to the compounder.

Still referring to FIG. 1, the ground plastic material in the silos or hoppers 24 and 40 can be transferred either manually or by an automated program via enclosed augers 46 and 48 to a blender machine 50. The blender machine 50, which is shown in greater detail in FIG. 18, is capable of running multiple mixing programs. The mixing programs determine the percentage of e-waste plastic 10 from the hopper 24 and the ink cartridge plastic 12 from the hopper 40 in the final mixture. By way of example only, the e-waste plastic in the hopper 24 in the first plastic recycling stream is referred to as "clean plastic", since it contains of substantially all ABS plastic from computer shrouds and printer parts. On the other hand, the inkjet cartridge plastic waste in the hopper 40 from the second recycling stream is referred to as "dirty plastic", since it contains printer cartridge pieces, bits of dried ink, small circuit board chips, and small amounts of metal and foam particles.

The percentage of either of the first and second plastic streams may range from 0% to 100% and will be chosen in accordance with the property requirements of the end product. For example, when the end product is a landscaping stepping stone, the material from the hoppers 24 and 40 is selected in a 75% clean plastic/25% dirty plastic ratio. It will be understood that other ratios may also be employed depending, for example, upon the use requirements of the end product, the availability of computer and printer housings and ink jet printer cartridges, and the requirements for material flexibility and end product consistency.

The blender 50 also enables color to be provided in the end product. This may be achieved by mixing separate amounts of colorant in the blender 50. Alternately, and by way of example only, a selected color of the end product may be obtained by forming the plastic particulates in one or both of the hoppers 24 and 40 of the selected color plastic, such as green, blue, etc.

Referring again to FIG. 1, according to the selected control program in the blender 50, varying amounts of either or both of the two plastic material types 10 and 12 may be drawn from the respective silos 24 and 40 and carried up to a hopper 52 above the blender 50 through custom engineered augers 46 and 48.

As seen in FIG. 15, the hopper 52 sits directly above the blender or mixer 50. The blender 50 is a custom fabricated WSB series weigh scale blender made by L-R Systems of Joliet, Ill. The blender 50 is designed to mix the two components according to one of 99 recipes loaded into a memory. Materials are individually metered by auger feeders 46 and 48 into the batch mixing drum of the blender 50 until a recipe base set point is reached. The material drops from the hopper 52 into the mixing chamber of the blender 50 where the materials are then blended together.

In a process where only one of the first and second plastic streams is used, the blender 50 may or may not be employed. Since only one plastic stream is employed, the blender 50 is not required to provide the function of blending plastic particles from two different plastic streams. However, the blender 50 may still be employed in this situation for its preset batch quantity selection capability.

After a batch is completed, a mixing timer, which can be set between 0 and 60 seconds, starts timing. After the conclusion of the set mixing time period, the timer opens the slide gate to dump the contents of the mixing barrel into a collection bin or enclosed holding tank 54 of the blender 50.

The slide gate then closes enabling the blender 50 to start the next batch based on any material recipe. When the materials are needed, the materials are transferred by an enclosed auger 55 to a hopper 56 which is located directly over a custom engineered compounder 58, as shown in FIG. 1.

Prior to compounding, the material drawn from the holding tank 54 is weighed on an inline scale 60 (see FIG. 18). After the material is weighed, it is injected into the compounder 58 (see FIG. 17) wherein it undergoes emulsification. The compounder 58 is a custom modified compounder using thermo-kinetic technology manufactured by Resyk, Inc., now owned by Integrico. During emulsification, magnets 59 (see FIG. 18) in the compounder 58 remove any large metal pieces prior to the actual compounding or emulsification by teeth 57 (see FIG. 19).

Figure 17:
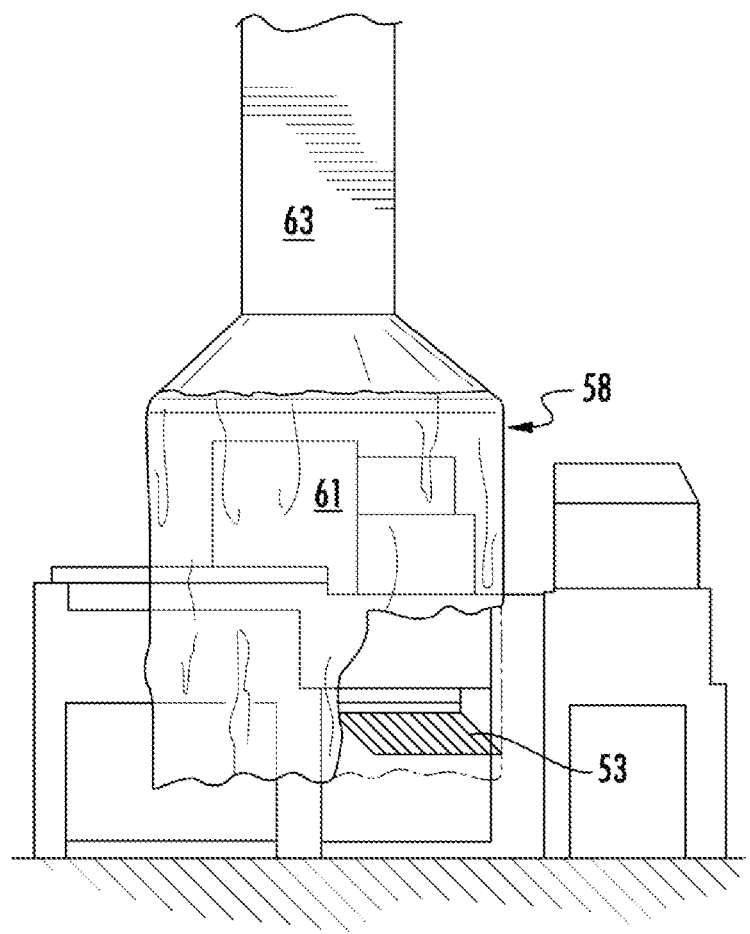
FIG. 17 is a perspective view of the custom mixing unit or blender shown in FIG. 1.

After emulsification, a carrier or tray 53 holding the emulsified plastic material descends below the compounder 58 behind a curtain 61 and vent hood 63, as shown in FIG. 17. The curtain 61 is acrylic with three inch overlapping sheets that surround the compounder 58 and the compounder output tray 53, and reaches substantially to the floor. Above the curtain 61 is a two foot draw fan ducted up to a second three foot draw fan located in the ceiling of the manufacturing facility. Exhaust exits the duct stack at a rate of 4,500 cubic feet per minute.

The operator waits for a few seconds to remove the material from the compounder output tray to maximize the emissions captured by the vent hood 63. The curtain 61 and vent hood trap 63 approximately 100 percent of the particulates and VOC emissions generated by heating the plastic material during the compounding process. A small percent of the total emissions may be released into the compounder room during the transfer of the material from the compounder output tray. After waiting the prescribed few seconds, the operator reaches through the curtain 61 and removes the output tray containing the emulsified recycled e-waste material.

Figure 21:
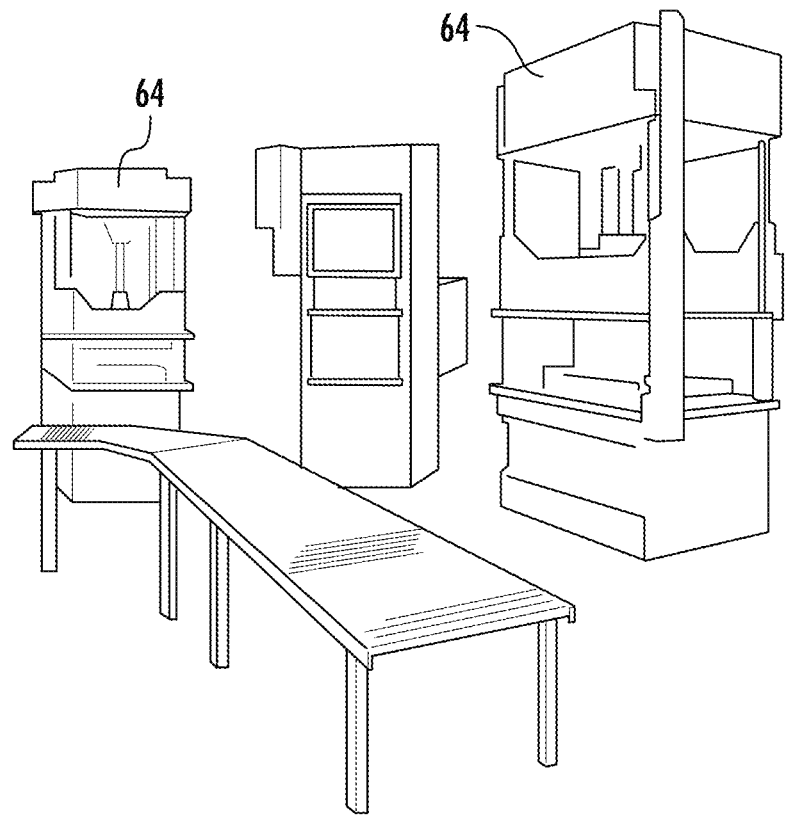
FIG. 21 is a perspective view of the multiple molding presses shown in FIG. 1.
Figure 22:
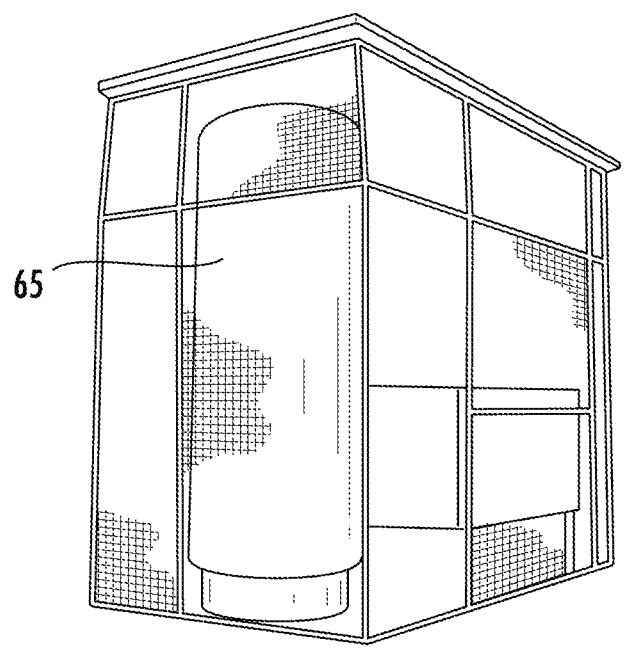
FIG. 22 is a perspective view of the chiller used with the presses shown in FIG. 19.

The material is then manually transferred to a mold 62 in one of a plurality of presses 64 (see FIG. 21). The presses 64 may be hydraulic presses, for example. The presses 64 are cooled by a 15 ton customized Zarsky chiller 65 (see FIG. 22) (model number ACWC-180-E, for example), which keeps the mold cool during the molding process to set the final plastic product. The chiller 65 is housed separately from the presses 64.

Figure 23:
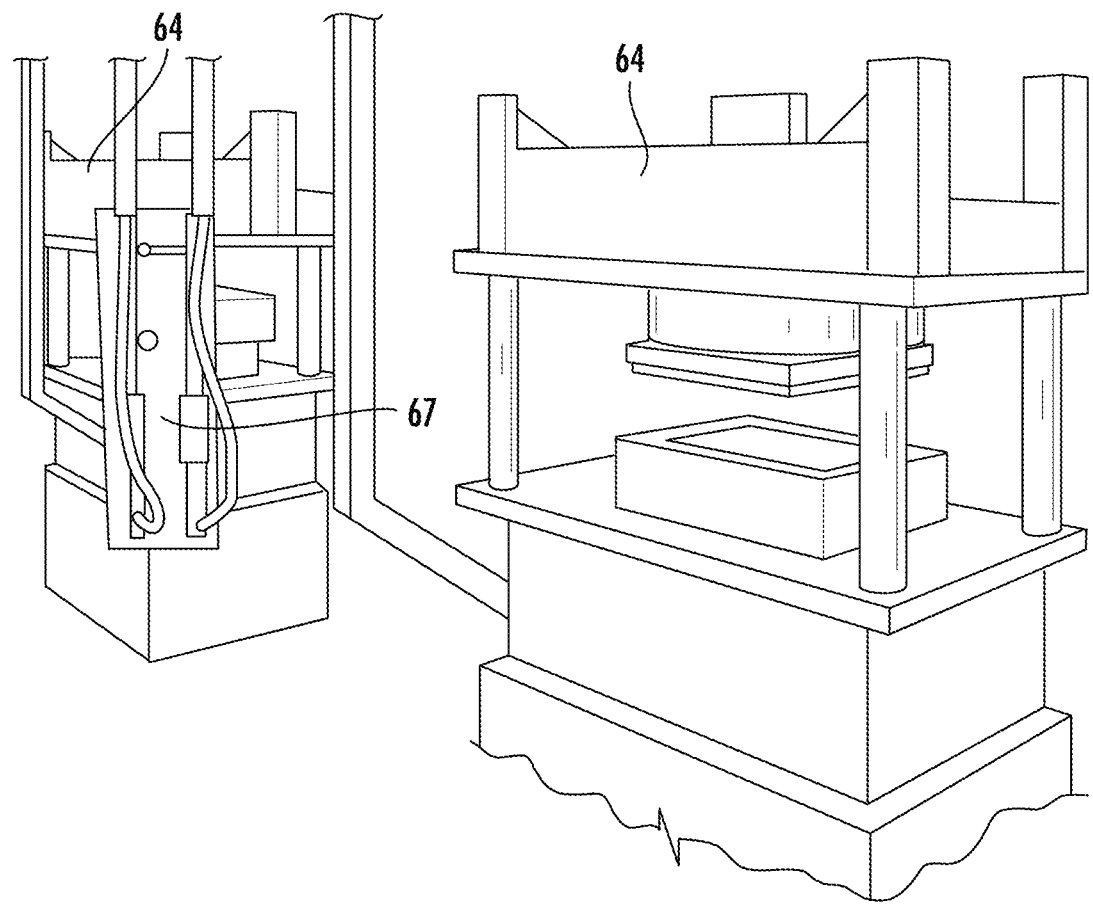
FIG. 23 is a perspective view of the heating and cooling control system 67 employed with the presses shown in FIG. 11.

For certain types of molds, a combination of heating and cooling is required. The control of the timing and the exact combination of heating and cooling is executed by a control system 67 connected to the chiller and each press 64 as shown in FIG. 23.

Figure 24:
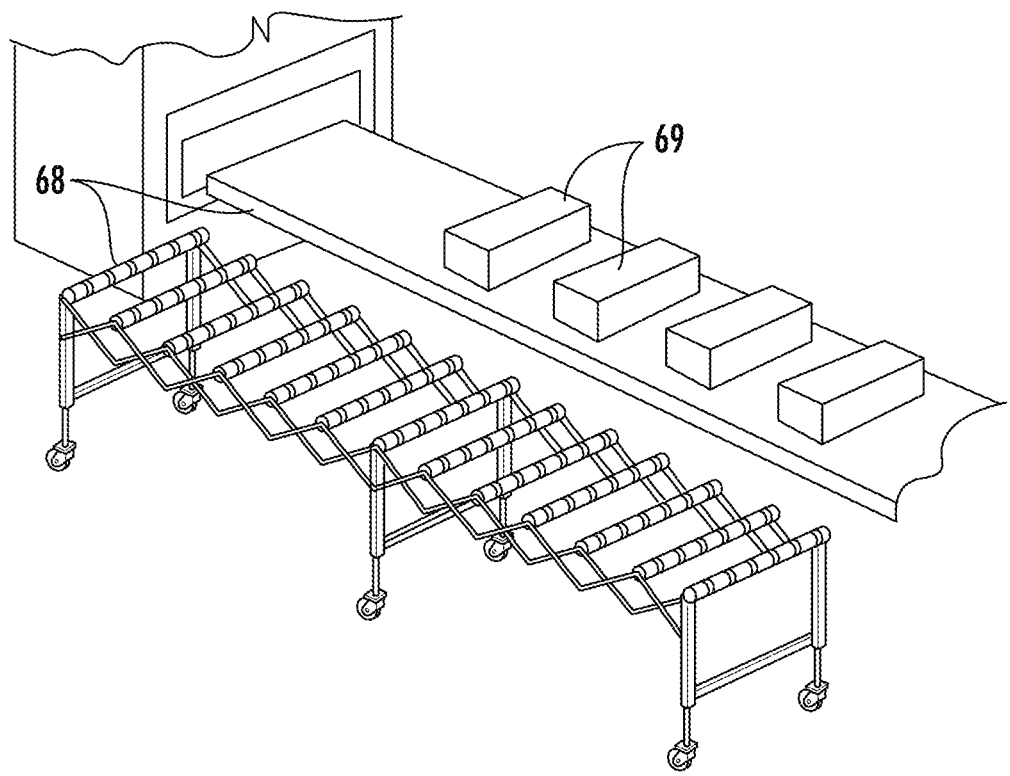
FIG. 24 is a perspective view of the finished product on weighting tables after molding.

After the plastic product has been set in the final shape, the product is released from the mode and placed on waiting tables 68, as shown in FIG. 24, before entering a sanding machine 66 for deburring. A final quality inspection is performed after deburring. After passing inspection, the final product 69 is placed in a distribution staging area to be palletized and shrink wrapped for shipment to the customer.

Figure 25:
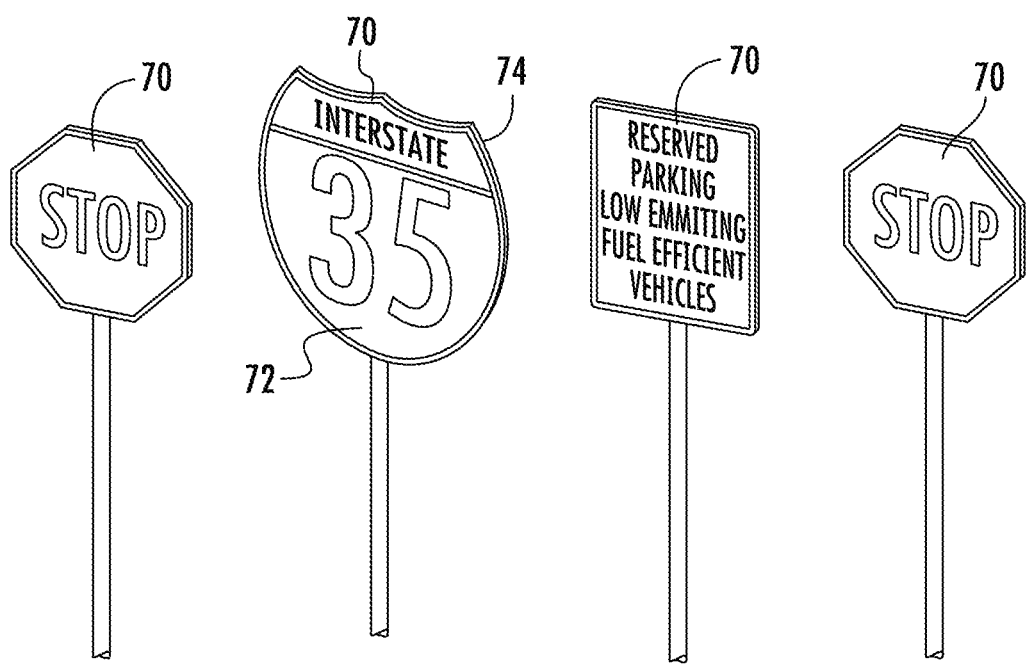
FIG. 25 is a front elevational view of road signs which can be made using the recycled e-waste plastic recycling method described herein.

The product made from the recycled e-waste plastic according to the present process can take a number of different shapes. For example, as shown in FIG. 25, the recycled plastic material can be molded into a substrate or base 74 for creating road signs 70 or any other type of signage. A suitable film 72, such as 3M reflective sheeting tape, carrying decorative indicia adhered to one side of the recycled e-waste plastic substrate 74 to create the road signs shown 70 in FIG. 23. Alternately, the road sign indicia, or any other sign indicia for which the substrate is employed, can be printed, using available printing techniques, directly on one surface of the substrate 74. The applied coating may be reflective, partially reflective, or non-reflective, depending upon the purpose and use of the sign.

Figure 26:
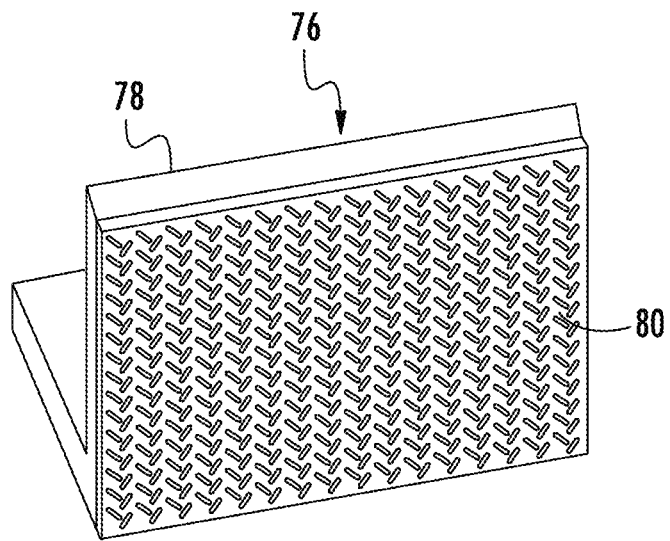
FIG. 26 is a perspective view of a road delineator (barrier reflector) which can be made using the e-waste plastic recycling method.
Figure 27:
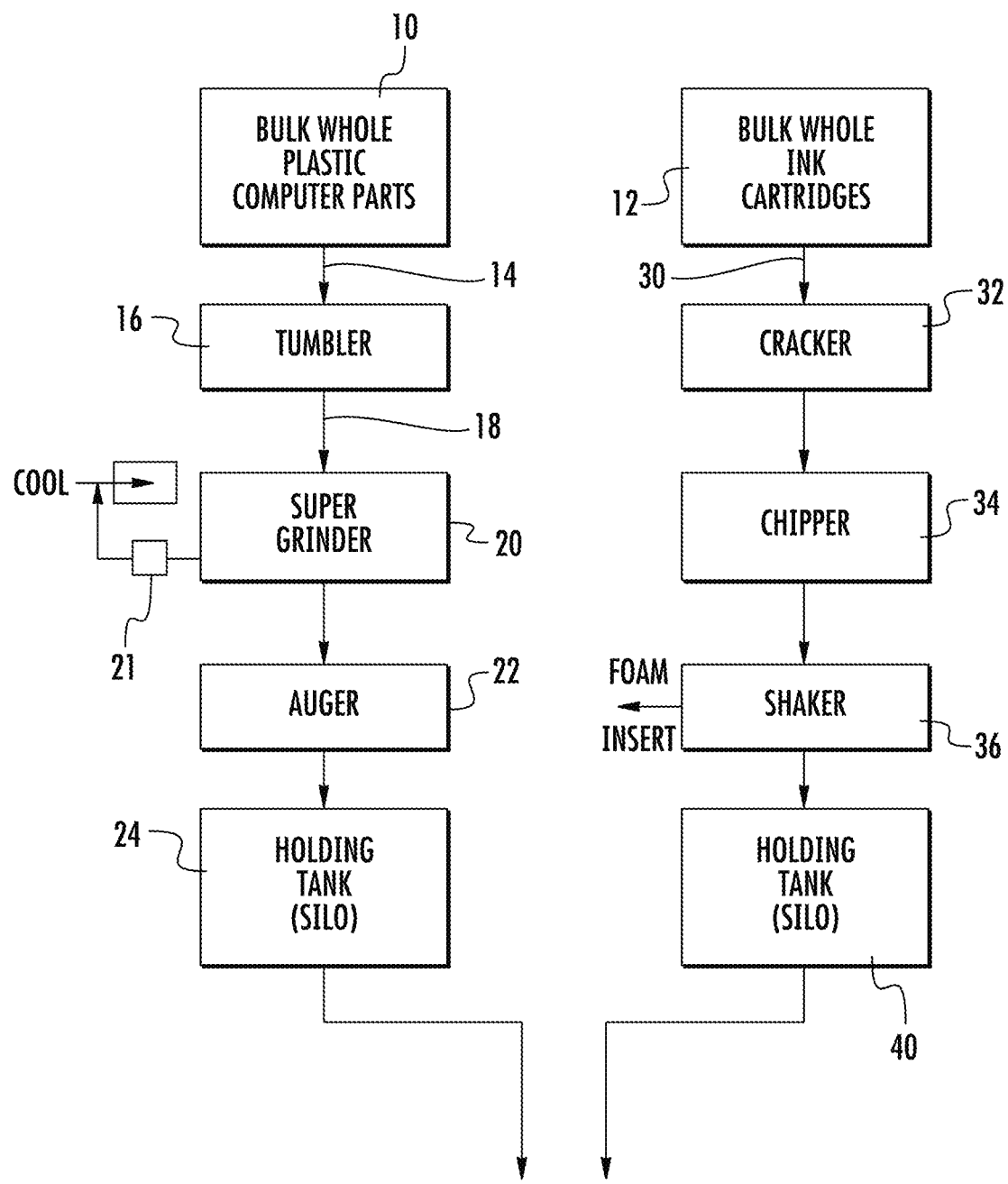
FIGS. 27-28 are flow diagrams depicting the sequential steps on the e-waste plastic recycling method.
Figure 28:
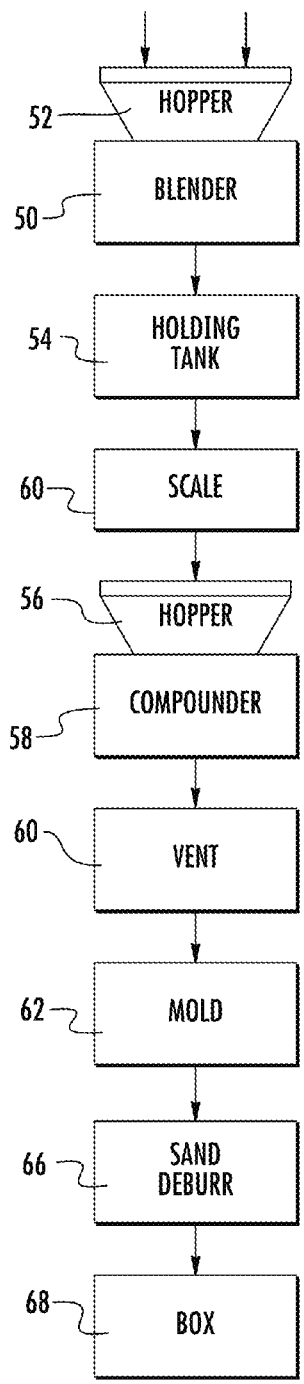

A road delineator 76 (see FIG. 26) or barrier reflector to delineate the edges of roads on curves, etc. is another product which can be made by the plastic recycling method described above. The delineator 76 includes a generally L-shaped substrate 78 formed of recycled plastic as described above. A thin layer of a reflective material 80 is secured to one surface of the delineator.

It is also possible to utilize the substrate, with or without indicia applied to one surface as the final end product. For example, the substrate can be shaped and used as a landscaping stepping stone.

Various materials may be utilized in the devices and methodologies described herein. However, the use of plastics or polymeric materials is preferred, and the use of recycled plastics (especially thermoplastics) or polymeric materials is especially preferred. Such materials may include acrylonitrile-butadiene-styrene (ABS), polycarbonate, polystyrene, styrene-acrylonitrile (SAN), polyvinylchloride (PVC), acetal, nylon, polyethylene, polypropylene, polyesters polyvinylchloride (PVC), acrylics, fluoropolymers and polymides. Mixtures and copolymers of the foregoing materials may also be used in the devices and methodologies described herein.

The use of ABS, and especially recycled ABS, in the devices and methodologies described herein is especially preferred. Suitable ABS resins include, for example, general purpose high gloss grade ABS resins having a melt flow rate (MFR) of 6.0 g/10 min (3.8 kg, 230° C.) and an Izod impact strength of 5.5 ft-lb/in. ABS is commonly used to form rigid computer parts, such as computer and printer housings, and ink cartridges. Hence, ABS represents a significant waste stream that is available in large volumes. Moreover, ABS resists biodegradation due to the flame retardants and UV inhibitors it is typically compounded with, and hence presents disposal and landfill issues. The devices and methodologies disclosed herein advantageously utilize these properties in applications such as signage, and thus turn an environmental liability into useful products.

As noted above, the polymeric materials used in the devices and methodologies described herein may contain various flame retardants. Such flame retardants may include various halogenated materials such as, for example, tetrabromobisphenol-A (TBAA), 1,2-bis(2,4,6-tribromophenoxy)ethane (TBPE) or octabromodiphenyl oxide (OB-DPO). These flame retardants may be used in various amounts, but are typically used in amounts in the range of about 5% to about 40%, preferably in the range of about 10% to about 30%, more preferably in the range of about 10% to about 25%, and most preferably in the range of about 15% to about 17%, based on the total weight of the formulation. The polymeric materials may also contain one or more UV stabilizers.

The polymeric materials used in the devices and methodologies described herein may also contain various metal oxides. Some of these metal oxides may provide a synergistic effect with the foregoing flame retardants and thus reduce the amount of flame retardant required, which in turn can give rise to polymeric compositions having improved physical properties. Examples of such materials may include antimony pentoxide (such as that available commercially under the designation BurnEx ADP494) and antimony trioxide. These materials may be utilized in various amounts. ABS polymers compounded with bromine-containing flame retardants, the antimony pentoxide or antimony trioxide is preferably formulated at mole ratios of 3:1 and 4:1 (bromine:antimony).

While virgin polymeric materials used in the devices and methodologies described herein may be compounded with the above noted materials, recycled materials may already contain these additives. In this case, it is preferred to process these materials in a way that will avoid loss of these materials. For example, U.S. Ser. No. 13/109,545 (Abadi et al.), which has been referenced above, discloses methods for processing recycled ABS and other materials which avoids volatilization of the flame retardants these materials contain.

While the foregoing description has described the articles and methodologies disclosed herein primarily with respect to flat panels, one skilled in the art will appreciate that various articles of various shapes may also be produced through suitable application or modification of the principles disclosed herein. For example, connector pieces of various shapes and configurations may be utilized in combination with the panels described herein to achieve articles having various shapes. By way of example, connector pieces (which may essentially be a panel of the type described herein, but bent or curved at a given angle such as, for example, 45°, 60° or 90°) may be used in conjunction with the foregoing panels to achieve multi-panel articles having various configurations.

It will further be appreciate that the articles produced in accordance with the methods described herein are not limited to signage. By way of example (but not limitation), such articles may include plastic pavers, decking, wall coverings, playground structures, and the like.

It will also be appreciated that the articles produced in accordance with the teachings herein may be subjected to further processing to produce various products. For example, signage may be created from these articles by applying reflective sheeting, lettering, UV protective layers, and other suitable components. In some applications, the substrate may have to be primed, roughened, or otherwise prepared prior to the application of these materials.

In a preferred embodiment of the systems and methodologies described herein, the e-plastic waste stream feedstock, which will frequently comprise ABS, is molded at temperatures close to the glass transition temperature of the polymer, or at temperatures between the glass transition temperature of the feedstock and a temperature at which the feedstock is fully molten (that is, the feedstock material is preferably molded when it is in a semi-molten state). Thus, for example, in the case of ABS, the feedstock is preferably molded at a temperature within the range of 100° C. to 108° C. At these temperatures, volatilization and/or decomposition of the flame retardants (and/or UV stabilizers) is avoided or minimized, thus resulting in a molded article in which the amount of flame retardants (and/or UV stabilizers) in the polymer is the same, or substantially the same, as the amount of flame retardants (and/or UV inhibitors) in the feed stream. Consequently, the molded article will exhibit the same, or similar, flame resistance (and/or UV resistance) as the e-waste feedstock from which it was derived. Consequently, the need to add more flame retardants or UV inhibitors is reduced or eliminated. At the same time, emissions during the molding process of volatilized flame retardants or UV inhibitors or their decomposition products is also reduced or eliminated.

The foregoing process may be contrasted with processes such as those disclosed in U.S. Pat. No. 7,902,262 (Armstrong). There, feedstocks of polymeric materials containing brominated flame retardants are utilized. These feedstocks are processed at temperatures of 250-300° C. for the specific purpose of inducing debromination of the materials in the extruder. Such debromination occurs through the evolution of gaseous hydrobromic acid (HBr) and organobromine compounds. Indeed, Armstrong notes (at Col. 14, Lines 5-14) that temperatures lower than 250° C. are considered to not induce sufficient decomposition of brominated flame retardants to gaseous bromine compounds.

In contrast to the approach of Armstrong, the preferred processing temperatures used in molding materials in accordance with the systems and methodologies disclosed herein are close to the glass transition temperature of the polymeric material, and hence typically represent minimum (or close to minimum) temperatures at which the polymeric materials may be molded. Hence, in contrast to Armstrong, these systems and methodologies retain in the molded article all, or essentially all, of the original content of flame retardants and/or UV inhibitors. As a result, these systems and methodologies are advantageous in that they can generate articles from e-waste feedstocks which are especially well suited for outdoor applications (such as, for example, use in signage, in lawn products such as stepping stones, and in various other applications where UV resistance and flame resistance is advantageous). Moreover, the molding of these articles does not generate substantial amounts of decomposition products (e.g., debromination products) from the flame retardants or UV inhibitors present in the polymeric material.

The glass transition temperature range for ABS and other polymeric materials may be determined by various means. One of the most accurate means of determining a glass transition temperature range (and the associated glass transition temperature, which is often taken as the midpoint of this range) is through differential scanning calorimetry (DSC), which is described in further detail at http://en.wikipedia.org/wiki/Differential_scanning_calorimetry. As explained therein, differential scanning calorimetry (DSC) is a thermoanalytical technique which measures the difference (as a function of temperature) in the amount of heat required to increase the temperature of a sample as compared to the amount of heat required to increase the temperature of a reference material. Typically, the sample and reference material are maintained at nearly the same temperature throughout the experiment. Moreover, the sample holder temperature is typically increased linearly as a function of time. The reference sample is typically chosen to be a material having a well-defined heat capacity over the range of temperatures to be scanned.

The basic principle underlying DCS is that, when the sample undergoes a physical transformation such as a phase transition, the amount of heat required to maintain the sample at the same temperature as the reference material will either increase or decrease, depending on whether the phase transition is endothermic or exothermic. For example, when the sample begins to melt, the absorption of heat by the sample as it undergoes the endothermic phase transition from a solid to liquid will typically require a greater influx of heat into the sample in order to increase its temperature at the same rate as the reference material. Likewise, as the sample undergoes exothermic processes (such as, for example, crystallization), less heat is required to raise the sample temperature. By observing the difference in heat flow between the sample and reference material, differential scanning calorimeters are able to measure the amount of heat that is absorbed or released during such transitions. DSC may also be used to observe more subtle physical changes, such as glass transitions.

An example of the use of DSC to determine the glass transition temperature ($T_G$) of ABS may be found in M. Żenkiewicz et al., "Some Effects of Multiple Injection Moulding on Selected Properties of ABS", Journal of Achievements in Materials and Manufacturing Engineering, Vol. 37, Issue 2, pp. 361-368 (December 2009) (Żenkiewicz et al.), which is available online at http://www.journalamme.org/papers_vol37_2/37221.pdf. In that reference, the author was investigating the change in $T_G$ in various polymers as a function of the number of times the polymer was reheated (he found little change in the case of ABS). In particular, as noted on Page 363 of Żenkiewicz et al., "The aim of these measurements was to examine the effect of multi-injection moulding of ABS on its glass temperature (Tg)."

Figure 29:
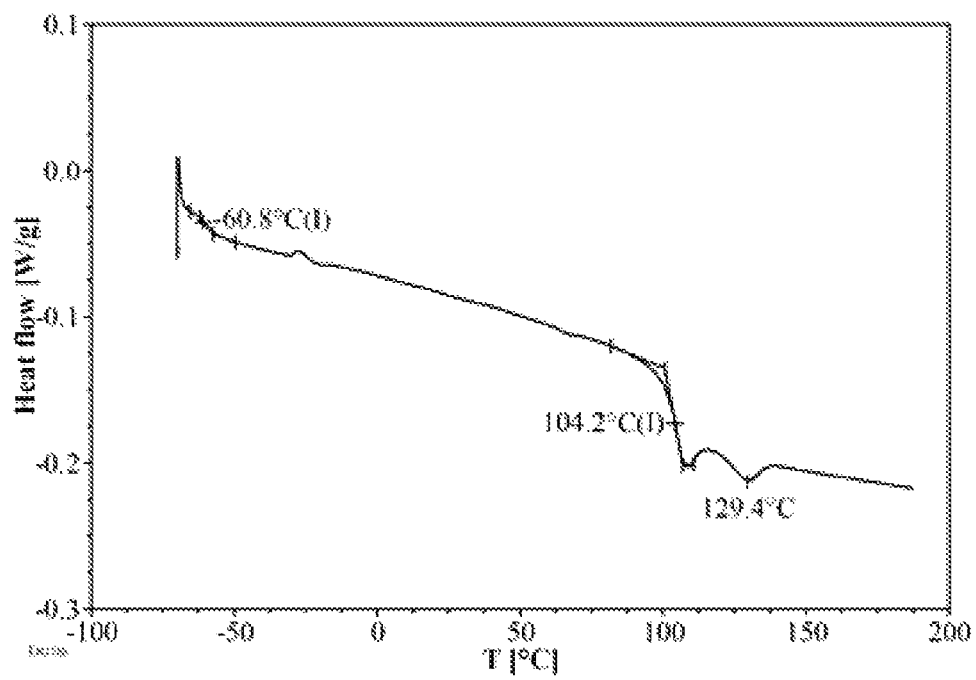
FIG. 29 is a graph of heat flow as a function of temperature, which was generated during the differential scanning calorimetry of an ABS sample.

The DSC curve obtained by Zenkiewicz et al. is reproduced in FIG. 29. As seen therein, the $T_G$ of ABS is commonly taken as the midpoint (104.2° C.) of the glass transition temperature range (the sudden downward slope of the curve, indicating an endothermal process, which spans about 100° C. to about 108° C.), and is in agreement with several other literature sources. See, e.g., http://en.wikipedia.org/wiki/Acrylonitrile_butadiene_styrene, which reports that the glass transition temperature of ABS "is approximately 105° C. (221° F.)".

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method, comprising:
   providing a feedstock comprising an ABS plastic which contains a flame retardant and a UV inhibitor;
   heating the feedstock until it is in a semi-molten state; and
   molding the feedstock into an article while it is in the semi-molten state;
   wherein molding the feedstock into an article while it is in the semi-molten state includes molding the article at a temperature within the range of 100° C. to 108° C.

2. The method of claim 1, wherein heating the feedstock until it is in a semi-molten state includes heating the feedstock to above its glass transition temperature.

3. The method of claim 1, wherein the ABS feedstock is in the form of e-waste plastic parts and wherein, prior to heating the feedstock, the plastic parts are broken down into a particulate mass.

4. The method of claim 3, wherein breaking down the plastic parts into a particulate mass includes:
   cutting the plastic parts into smaller pieces; and
   using at least one of a tumbling operation and a grinding operation to reduce the smaller pieces into the particulate mass.

5. The method of claim 3, wherein breaking down the plastic parts into a particulate mass includes:
   cutting the plastic parts into cut pieces;
   reducing the size of the cut pieces by tumbling them in a tumbler thereby producing tumbled pieces; and
   further reducing the size of the tumbled pieces by grinding them in a grinder.

6. The method of claim 5, further comprising:
   during the grinding operation, maintaining the temperature of the tumbled pieces below the melting point of the ABS plastic.

7. The method of claim 1, wherein the feedstock comprises spent plastic ink cartridges.

8. The method of claim 7, wherein the spent plastic ink cartridges contain foam inserts and, prior to heating the feedstock, further comprising:
   reducing the plastic ink cartridges into plastic particles;
   separating the foam from the plastic particles.

9. The method of claim 8, wherein reducing the plastic ink cartridges into plastic particles includes subjecting the plastic ink cartridges to at least one of a cracking process and a chipping process.

10. The method of claim 8, wherein reducing the plastic ink cartridges into plastic particles further comprises:
    subjecting the plastic ink cartridges to a cracking operation process, thereby cracking the plastic ink cartridges into smaller pieces and separating the foam insert from the smaller pieces; and
    subjecting the smaller pieces to a chipping operation to reduce the smaller pieces to particles.

11. The method of claim 1, wherein providing a feedstock comprising an ABS plastic which contains a flame retardant and a UV inhibitor includes
    providing first and second e-waste feed streams, wherein the first e-waste feed stream comprises thermoplastic materials from electronic equipment housings, wherein the second e-waste feed stream comprises plastic ink cartridges, and wherein each of the ink cartridges includes a foam insert;
    processing the first e-waste feed stream by (a) breaking down plastic parts into particulates, and (b) depositing the particulates into a first storage container;
    processing the second e-waste feed stream by (a) breaking down plastic ink cartridges into plastic particulates, (b) separating a foam insert from the plastic particulates, and (c) transferring the plastic particulates to a second storage container; and
    blending predetermined quantities of the e-waste plastic particulates from the first and second storage containers to form a blended mass.

12. The method of claim 11, wherein at least one of the first and second e-waste streams comprises ABS.

13. The method of claim 11, wherein each of the first and second e-waste streams comprises ABS.

14. The method of claim 13, wherein the temperature of the first e-waste feed stream is maintained below the melting point of ABS during processing thereof.

15. The method of claim 13, wherein the temperature of the second e-waste feed stream is maintained below the melting point of ABS during processing thereof.

16. The method of claim 1, wherein molding the feedstock into an article while it is in the semi-molten state includes molding the feedstock in a press.

17. The method of claim 16, wherein the press is a hydraulic press equipped with a mold and a chiller, and wherein the chiller chills the mold during the molding process.

18. A method for molding a feedstock into an article, comprising:
    providing a feedstock comprising an ABS plastic which contains a flame retardant and a UV inhibitor, wherein the ABS feedstock is in the form of e-waste plastic parts that have been broken down into a particulate mass;
    heating the feedstock until it is in a semi-molten state;
    placing the semi-molten feedstock into a mold disposed within a press; and
    using the press to mold the feedstock into an article while the feedstock is in the semi-molten state;

wherein molding the feedstock into an article while it is in the semi-molten state includes molding the article at a temperature within the range of 100° C. to 108° C.

19. The method of claim 18, wherein the press is a hydraulic press.

\* \* \* \* \*